United States Patent
Rajagopal et al.

(10) Patent No.: US 12,254,332 B2
(45) Date of Patent: Mar. 18, 2025

(54) AUTOMATED BOT FOR ERROR-FREE RACKING-STACKING

(71) Applicant: RELIANCE JIO INFOCOMM USA, INC., Frisco, TX (US)

(72) Inventors: Arun Rajagopal, Frisco, TX (US); Abhijeet Singh, Seattle, WA (US); Venugopal Kanumalla, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 501 days.

(21) Appl. No.: 17/734,480

(22) Filed: May 2, 2022

(65) Prior Publication Data

US 2023/0350704 A1 Nov. 2, 2023

(51) Int. Cl.
| | |
|---|---|
| *G06F 9/00* | (2018.01) |
| *G06F 9/451* | (2018.01) |
| *G06T 7/00* | (2017.01) |
| *G06V 20/64* | (2022.01) |
| *G06V 20/70* | (2022.01) |

(52) U.S. Cl.
CPC ............ *G06F 9/453* (2018.02); *G06T 7/0006* (2013.01); *G06V 20/647* (2022.01); *G06V 20/70* (2022.01)

(58) Field of Classification Search
CPC ...... G06F 9/453; G06F 16/2455; G06F 11/22; G06V 20/70; G06V 20/647; G06T 7/0006; G06N 21/01; G06N 20/00; G06N 20/10; G06N 20/20; G06K 9/6201
See application file for complete search history.

(56) References Cited

U.S. PATENT DOCUMENTS

| | | | |
|---|---|---|---|
| 7,523,892 | B2 | 4/2009 | Cook |
| 7,685,083 | B2 | 3/2010 | Fairweather |
| 7,689,510 | B2 | 3/2010 | Lamkin et al. |
| 8,112,176 | B2 | 2/2012 | Solomon |
| 8,566,115 | B2 | 10/2013 | Moore |
| 8,958,662 | B1 | 2/2015 | Grosz et al. |
| 9,367,362 | B2 | 6/2016 | Kern |

(Continued)

FOREIGN PATENT DOCUMENTS

| | | | | |
|---|---|---|---|---|
| CA | 2523548 C | * | 2/2014 | ......... G06F 16/2455 |
| CA | 3006147 C | * | 6/2017 | |

(Continued)

OTHER PUBLICATIONS

International Search Report and The Written Opinion of the International Search Authority—The European Patent Office—mailed Aug. 1, 2023 for PCT/US23/20553, 15 pages.

*Primary Examiner* — Steven P Sax
(74) *Attorney, Agent, or Firm* — Jackson Walker LLP; Christopher J. Rourk (57) ABSTRACT

A system for hardware installation is disclosed that includes a rack template system operating on a first processor and configured to receive location data and to provide a workflow of a series of rack image data sets. An agent system operating on a second processor and configured to display the series of rack image data sets and to prompt a user to enter user-generated image data sets. A rack validator operating on the first processor and configured to receive the user-generated image data sets and to determine whether the user-entered image data sets match the series of rack image data sets.

18 Claims, 2 Drawing Sheets

(56) References Cited

U.S. PATENT DOCUMENTS

| | | | |
|---|---|---|---|
| 9,612,765 B2 * | 4/2017 | Huang | G06F 9/5072 |
| 9,692,707 B2 | 6/2017 | Tang et al. | |
| 9,740,757 B1 | 8/2017 | Gilder et al. | |
| 9,794,370 B2 | 10/2017 | Abbasi et al. | |
| 9,911,290 B1 | 3/2018 | Zalewski et al. | |
| 9,960,637 B2 | 5/2018 | Sanders et al. | |
| 10,221,013 B2 | 3/2019 | Buzan et al. | |
| 10,346,621 B2 | 7/2019 | Athuluru Tlrumala et al. | |
| 10,740,293 B2 | 8/2020 | Maturana et al. | |
| 10,746,428 B2 | 8/2020 | Przybylski et al. | |
| 10,769,231 B2 | 9/2020 | Kol et al. | |
| 10,778,534 B2 | 9/2020 | Chitalia et al. | |
| 10,834,562 B1 | 11/2020 | Zalewski et al. | |
| 10,867,282 B2 | 12/2020 | Glunz | |
| 10,999,163 B2 | 5/2021 | Abraham | |
| 10,999,251 B2 | 5/2021 | Miriyala et al. | |
| 11,124,361 B2 | 9/2021 | Lert et al. | |
| 11,138,539 B2 | 10/2021 | Sethi et al. | |
| 11,189,368 B2 | 11/2021 | Heath | |
| 2007/0093970 A1 | 4/2007 | Padmanabhan et al. | |
| 2011/0246627 A1 | 10/2011 | Kern | |
| 2014/0278244 A1 * | 9/2014 | Humphrey | G01N 21/01 702/182 |
| 2016/0189174 A1 | 6/2016 | Heath | |
| 2018/0035606 A1 * | 2/2018 | Burdoucci | A01D 34/008 |
| 2018/0052451 A1 | 2/2018 | Billi-Duran et al. | |
| 2019/0109810 A1 | 4/2019 | Rapaport et al. | |
| 2019/0140580 A1 | 5/2019 | Poivet | |
| 2019/0236530 A1 * | 8/2019 | Cantrell | G06V 40/23 |
| 2019/0332785 A1 | 10/2019 | Athuluru Tlrumala | |
| 2020/0082168 A1 * | 3/2020 | Fathi | G06T 7/521 |
| 2020/0133666 A1 | 4/2020 | Prinsloo et al. | |
| 2020/0136930 A1 | 4/2020 | Szulman et al. | |
| 2020/0409690 A1 * | 12/2020 | Rouland | G16Y 30/00 |
| 2021/0019194 A1 | 1/2021 | Bahl et al. | |
| 2021/0086643 A1 * | 3/2021 | Satheesh Babu | B60L 53/14 |
| 2021/0127943 A1 * | 5/2021 | Ha | A47L 15/427 |
| 2021/0142110 A1 | 5/2021 | Tian | G06V 20/68 |
| 2021/0264202 A1 * | 8/2021 | Kalluri | G06Q 50/01 |
| 2021/0389338 A1 | 12/2021 | Kochar et al. | |
| 2022/0222047 A1 * | 7/2022 | Todirel | G06F 8/70 |
| 2022/0351365 A1 * | 11/2022 | Fowler | G06N 20/00 |
| 2023/0008703 A1 * | 1/2023 | Leffler | G06N 20/00 |
| 2023/0045683 A1 | 2/2023 | Mahajan et al. | |

FOREIGN PATENT DOCUMENTS

| | | | | |
|---|---|---|---|---|
| CN | 106778920 A | * | 5/2017 | |
| CN | 112991556 B | * | 5/2022 | G06K 9/6201 |
| JP | 2012-93830 | | 5/2012 | |
| KR | 102416227 B1 | * | 7/2022 | |
| RU | 2376164 C1 | * | 12/2009 | |
| RU | 2013113164 A | * | 10/2014 | |
| WO | 2022/064261 | | 3/2022 | |

* cited by examiner

AUTOMATED BOT FOR ERROR-FREE RACKING-STACKING

RELATED APPLICATIONS

This non-provisional application is related to U.S. patent application Ser. No. 17/689,430 filed Mar. 8, 2022 entitled "CLOUD AUTOMATION SITE DESIGN AND METHOD", and is related to U.S. patent application Ser. No. 17/713,490 filed Apr. 5, 2022 entitled "CLOUD AUTOMATION MICROBOTS AND METHOD OF USE", and is related to U.S. patent application Ser. No. 17/750,473 filed May 23, 2022 entitled "CLOUD AUTOMATION AGENTS AND METHOD OF USE", which are hereby incorporated by reference for all purposes, as if presented herein in their entireties.

TECHNICAL FIELD

The present disclosure relates generally to equipment configuration, and more specifically to a system and method for providing an automated software robot or "bot" for error-free installation of equipment in racks in the field ("racking-stacking").

BACKGROUND OF THE INVENTION

Field installation of rack-mounted equipment can often create problems and cause equipment damage. Even a skilled technician may encounter differences between specifications and as-built configurations, and the similarity between rack mounted equipment in large systems can also lead to confusion.

SUMMARY OF THE INVENTION

A system for hardware installation is disclosed that includes a rack template system that can receive location data, such as GPS coordinates, and can provide a workflow of a series of rack image data sets to assist an installer with configuring a rack of equipment at the location. An agent system is configured to display the series of rack image data sets and to prompt a user to enter user-generated image data sets, such as at each step of an installation process. A rack validator receives the user-generated image data sets and determines whether the user-entered image data sets match the series of rack image data sets, such as by providing confirmation at each step of the installation process to take the next step.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is related to systems and algorithmic processes that are typically implemented in software that operates on a processor, to enable telecom operators and other network operators to fully mechanize the process of installing and configuring hardware and associated software for a cloud computing environment or other suitable computing or telecommunications environments, such as servers, switches, routers, edge servers, networking software, server software, patch cabling, radio band units and other hardware and software used for build and operations of distributed telecommunications company cloud and edge infrastructure. The present disclosure provides the technical features of enabling telecom operators and hardware Original Equipment Manufacturer (OEM) partners to provide a consistent and reliable experience to the end consumer of the cloud computing environment by enabling error free deployment of hardware and software elements.

In one example embodiment, the disclosed automation system and algorithmic processes can be used by an OEM vendor to rack, stack and deliver hardware to a customer, to install the hardware without any errors or re-runs, to configure the hardware with associated software, to resolve complex logistics challenges, to configure data centers, mobility locations, remote edge locations or to provide other suitable functions. The present disclosure can be used to provide on-demand infrastructure racking layout, automated workflows and other suitable functions. The present disclosure can include an application that runs on a mobile device or laptop computer, to assist an installer and also to certify the installed system components and to provide sign-off for the work after it has been completed.

The present disclosure can be implemented using components that run centrally and provide a dashboard with target design configurations of hardware to be stacked and a smart application that runs on a mobile device, either connected or in a disconnect mode, as well as other suitable configurations. In one example embodiment, machine learning models can be used to detect physical networking connections such as RJ45 compatible devices, fiber optic media, small form factor pluggable devices, coaxial compatible devices, HDMI devices and so forth, to interpret design information that is obtained from a cloud software repository, to validate a configuration state and to perform other suitable functions, such as to determine whether a device is plugged in to a port or not, if it is in the right port as per the design specification, whether the software applications installed on the device are correct and are configured correctly and other suitable functions. A workflow running on the remote agent can be used to finalize the racking-stacking in a series of steps, such as where a user can generate image or video data that is analyzed to determine whether equipment is in a proper configuration, where machine learning can instruct the user to perform a next action based upon success on current step and in other suitable embodiments.

The present disclosure enables users to fully mechanize the critical process of installing hardware. For example, networking equipment, servers, patch cabling, radio band units and other equipment are used to build and operate distributed telecommunications cloud systems and associated edge infrastructure, and the present disclosure can be used to ensure that all installations are fully documented and compliant with a design. Furthermore, the present disclosure enables telecommunications equipment operators and hardware OEM partners to provide a consistent reliable experience to the end user of the hardware, by enabling error free deployment of hardware elements.

In one example embodiment, the present disclosure relates to an automation system that can help OEM vendor personnel to rack-stack and deliver hardware, and to install the hardware without any errors or re-runs. The present disclosure can be used to address complex logistics challenges at data centers, mobility locations or remote edge locations, by providing on-demand infrastructure racking layout, automated workflows and an application that can run on third party user devices, to help an installer to start and finish the installation process. At the end of the installation process, the present disclosure can certify the installation and provide sign-off for the work completed.

The present disclosure can be implemented using a first component that runs centrally and which is configured to provide a dashboard and target design configurations of hardware to be stacked. In addition, a smart application that runs on a mobile device, in either connected or disconnect mode, can interface with the first component to allow a user to implement the workflows and to obtain information that can be used to validate the installation.

The present disclosure can utilize Machine Learning techniques and models to detect networking connections, such as RJ45, fiber, small form-factor pluggable connectors, coaxial, HDMI and so forth, and can interpret a target design that is downloaded from a central server to validate a hardware state. For example, the present disclosure can determine whether a cable is plugged into an RJ45 port, and if it is plugged in, whether it is in the right port as per the design specification. A workflow running on agent side can be used by the installer to finish racking-stacking in a series of steps. At each step, the installer can capture image data or video, and the present disclosure can analyze the image data or video and determine a next action upon successful completion of the current step.

Figure 1:
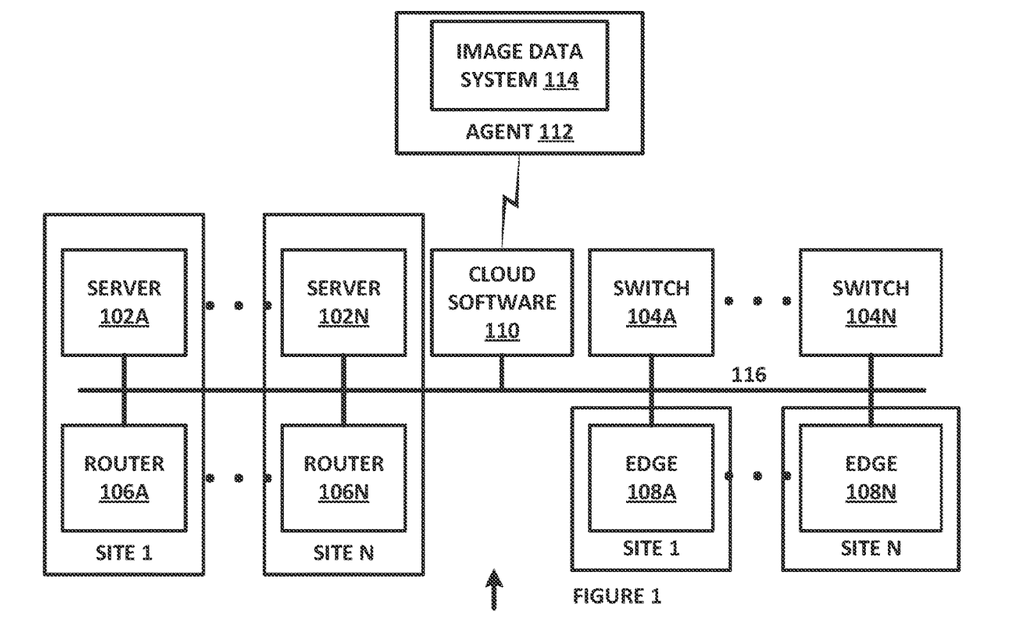
FIG. 1 is a diagram of a system for cloud computing site hardware and automated cloud software installation for an entire cloud computing system, in accordance with an example embodiment of the present disclosure.

FIG. 1 is a diagram of a system 100 for cloud computing site hardware and automated cloud software installation for an entire cloud computing system, in accordance with an example embodiment of the present disclosure. System 100 includes servers 102A though 102N, switches 104A through 104N, routers 106A through 106N, edge servers 108A through 108N, cloud software system 110, agent 112 and image data system 114, which are coupled over network 116, and which can be implemented as a wireline data communications medium, a wireless data communications medium, an optical data communications medium, other suitable data communications media or a suitable combination of data communications media.

Servers 102A though 102N can be implemented as separate hardware enclosures containing individual systems, separate hardware racks containing multiple system elements such as blades or cards, individual system elements such as blades or cards or other suitable systems or devices that are used in a cloud computing environment to provide cloud computing services upon demand. Servers 102A though 102N can be implemented at a single site, or at a plurality of different sites, such as where each server 102A through 102N is at a dedicated site 1 through site N as shown, where groups of servers 102A through 102N are at two or more different sites, where the number of different sites is less than the total number of servers, or in other suitable embodiments. Servers 102A though 102N can include one or more processors, one or more memory devices, input/output devices, network interfaces and other suitable components to allow them to be installed in a cloud computing system and automatically configured by cloud software system 110 or in other suitable manners to provide cloud computing services.

Switches 104A through 104N can be implemented as separate hardware enclosures containing individual systems, separate hardware racks containing multiple system elements such as blades or cards, individual system elements such as blades or cards or other suitable systems or devices that are used in a cloud computing environment to provide network switching services upon demand, including wireless data switching, wireline data switching, fiber optic data switching, a suitable combination of switching functions or other suitable data switching functions. Switches 104A though 104N can be implemented at a single site, or at a plurality of different sites, such as where each switch 104A through 104N is at a dedicated site 1 through site N as shown, where groups of switches 104A through 104N are at two or more different sites, where the number of different sites is less than the total number of servers, or in other suitable embodiments. The sites associated with servers 102A though 102N can be the same as the sites associated with switches 104A through 104N, can be different, or can include a suitable combination of dedicated sites and shared sites. Switches 104A through 104N can include one or more processors, one or more memory devices, input/output devices, network interfaces and other suitable components to allow them to be installed in a cloud computing system and automatically configured by cloud software system 110 or in other suitable manners to provide network switching for a cloud computing environment.

Routers 106A through 106N can be implemented as separate hardware enclosures containing individual systems, separate hardware racks containing multiple system elements such as blades or cards, individual system elements such as blades or cards or other suitable systems or devices that are used in a cloud computing environment to provide network routing services upon demand. Routers 106A though 106N can be implemented at a single site, or at a plurality of different sites, such as where each router 106A through 106N is at a dedicated site 1 through site N as shown, where groups of routers 106A through 106N are at two or more different sites, where the number of different sites is less than the total number of servers, or in other suitable embodiments. The sites associated with servers 102A though 102N and/or switches 104A through 104N can be the same as the sites associated with routers 106A through 106N, can be different, or can include a suitable combination of dedicated sites and shared sites. Routers 106A through 106N can include one or more processors, one or more memory devices, input/output devices, network interfaces and other suitable components to allow them to be installed in a cloud computing system and automatically configured by cloud software system 110 or in other suitable manners to provide network routing for a cloud computing environment.

Edge servers 108A through 108N can be implemented as separate hardware enclosures containing individual systems, separate hardware racks containing multiple system elements such as blades or cards, individual system elements such as blades or cards or other suitable systems or devices that are used in a cloud computing environment to provide edge network services upon demand. Edge servers 108A though 108N can be implemented at a single site, or at a plurality of different sites, such as where each edge server 108A through 108N is at a dedicated site 1 through site N as shown, where groups of edge servers 108A through 108N are at two or more different sites, where the number of different sites is less than the total number of servers, or in other suitable embodiments. The sites associated with servers 102A though 102N and/or switches 104A through 104N and/or routers 106A through 106N can be the same as the sites associated with edge servers 108A through 108N, can be different, or can include a suitable combination of dedicated sites and shared sites. Edge servers 108A through 108N can include one or more processors, one or more memory devices, input/output devices, network interfaces and other suitable components to allow them to be installed in a cloud computing system and automatically configured by cloud software system 110 or in other suitable manners to provide edge network services for a cloud computing environment.

Cloud software 110 can be implemented as one or more algorithms operating on a processor that cause the processor to provide operational code for servers 102A though 102N, switches 104A through 104N, routers 106A through 106N, edge servers 108A through 108N and other suitable equipment, to maintain and modify algorithms, applications and other instructions, to provide configuration information for use with servers 102A though 102N, switches 104A through 104N, routers 106A through 106N, edge servers 108A through 108N and other suitable components with a site data configuration and a site physical configuration, and to perform other suitable functions. In one example embodiment, cloud software 110 can be implemented using GITHUB from GITLAB, located in San Francisco, CA, or other suitable software development and version control systems.

Agent 112 can be implemented as one or more algorithms operating on a processor that cause the processor to interact with cloud software system 110 and other components of system 100. In one example embodiment, a user can access each component locally and over network 116 to verify that the component has been properly installed and provisioned, such as by using the algorithmic processes and functionality disclosed here or other suitable functionality.

Image data system 114 can be implemented as one or more algorithms operating on a processor that cause the processor to receive sets of image data and to analyze the image data to determine whether the image data reflects a proper configuration. In one example embodiment, image data analysis can be used to detect port locations, cabling connections and other suitable configuration data, and the identified configuration data can be compared to design configuration data. Image data system 114 can interface with system components of cloud software 110 to generate workflows and guidance to field installation personnel, to improve the ease of installation of equipment and to avoid improper equipment installation and configuration.

In operation, system 100 provides predefined tasks, allowable site configurations, allowable network details, allowable hardware details, allowable software details and other suitable data for a cloud network installation or other suitable systems. A network design document can be provided in an easy to read format, such as a markup language like XML, yet another markup language (YAML) or other suitable formats that are easy for a human operator to read, and which can be used to implement the process of cloud computing network deployment. In one example embodiment, the design document can include:

A) GITOPS predefined tasks that are stored in multiple files, such as where the file structure is used to provide a site design, such as a data center, a cloud computing network or other suitable systems. The file structure can include code for each server, each data switch, each data router, each edge server and other suitable components, to provide a code delivery mechanism.
B) Site configuration data—the names of equipment (servers, switches, routers), IP addresses and other suitable site configuration data.
C) Site Physical location data, such as building and room numbers, street addresses and so forth.
D) Data Center identifiers.
E) Domain Name System (DNS) data and other infrastructure details, such as a site type (ex: Green, Orange, Red), a form factor and other suitable data.
F) Network Details (such as a single file, multiple files, a YAML file with no specified start and end syntax or other suitable data structures).
G) IP address pools, spine and leaf configurations, border gateway protocol, routing networking layer.
H) Dynamic host configuration protocol information, Preboot eXecution Environment (PXE) information.
I) Hardware Details (separate or one file)
K) Physical node configuration data, including firmware, BIOS, out of band addresses, rack layouts, server layouts, host profiles, disk partitioning and so forth.
L) Software details (separate or one file—software to run cloud and applications in cloud all software runs in cloud), operating system and Boot Configurations, hypervisors, container runtimes, repositories.

In one example embodiment, system 100 can be used to perform a series of steps for provisioning a site design. In a first step, a design blueprint, templates or other suitable code structures can be created. In the second step, the design blueprint can be translated to site-specific code documents. Cloud parameters such as Internet Protocol addresses, DNS data, network time protocol (NTP) data and so forth can be applied. Information from inventory planning applications can be translated to virtual network functions and applications details, security configurations can be applied from information security frameworks or guidelines, Artificial Intelligence and Machine Learning toolsets can be used to verify and validate inputs and other suitable functions can also or alternatively be performed. A final step can include committing an instance of the site design to a central repository and triggering of blockchain events for next steps.

Each item of hardware can also have an associated site or location, such as Site 1 through Site N for servers 102A through 102N, routers 106A through 106N, edge servers 108A through 108N and so forth. While the example embodiment shown in system 100 includes server 102A, router 106A and edge server 108A at Site 1 and server 102N, router 106N and edge server 108N at Site N, other suitable combinations of sites and equipment can also or alternatively be used. For example, a first site can be used for all servers and a second site can be used for all routers, different sites can have different numbers and combinations of equipment or other suitable configurations can be used.

Figure 2:
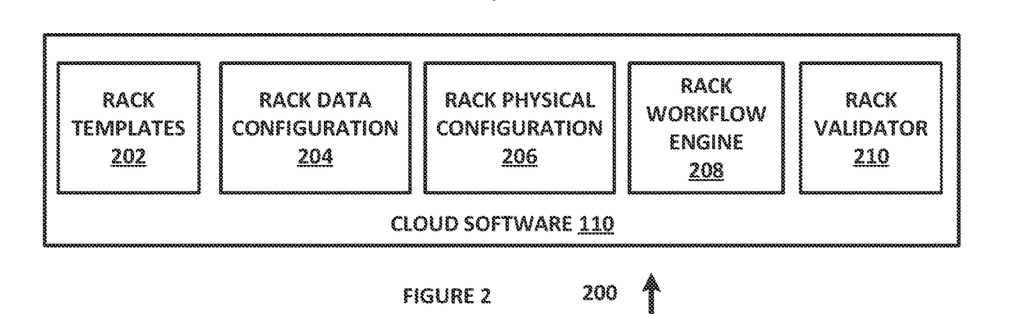
FIG. 2 is a diagram of a cloud software installation and update system, in accordance with an example embodiment of the present disclosure.

FIG. 2 is a diagram 200 of a cloud software installation and update system 110, in accordance with an example embodiment of the present disclosure. Cloud software installation and update system 110 includes rack templates system 202, rack data configuration system 204, rack physical configuration system 206, rack workflow engine 208 and rack validator 210, each of which can be implemented in hardware or a suitable combination of hardware and software.

Rack templates system 202 can be implemented as one or more algorithms operating on a processor that cause the processor to select and use one or more rack templates for installation of a plurality of devices associated with a rack at a cloud computing site or other suitable sites. In one example embodiment, templates can be designed for sites with a predetermined number of components, such as a 10 server cloud, which can include a predetermined number of switches, routers, edge servers and other suitable devices. Rack templates system 202 can detect a site configuration from a setting or detected hardware components and can select a suitable rack template for use with the site, including automated designation of equipment within the site configuration template. Rack templates system 202 can also interface with rack data configuration system 204, rack physical configuration system 206, rack workflow engine 208 and rack validator 210 to perform automated installation and provisioning of equipment for a cloud computing system or other suitable systems.

Rack data configuration system 204 can be implemented as one or more algorithms operating on a processor that cause the processor to configure rack equipment with logical device names such as names of servers and routers, with IP addresses and with other suitable site data. In one example embodiment, the rack data can be defined in advance for specific rack templates, and rack data configuration system 204 can be used in conjunction with a local installer to verify that the rack data has been properly configured. In this example embodiment, the rack data configuration can indicate different specific cabling connections for cables shown in an image of a rack template, such as to assist an installer with provisioning the correct cabling configurations as well as other hardware configurations.

Rack physical configurations system 206 can be implemented as one or more algorithms operating on a processor that cause the processor to identify physical configurations and locations of racks of servers, routers and so forth. In one example embodiment, a site map or other suitable data can be used to associate specific pieces of equipment with specific equipment racks on specific floors, rooms, off-site locations and other suitable data, so as to prevent the inadvertent misconfiguration of a rack due to its similarity to another rack in a different location.

Rack workflow engine 208 can be implemented as one or more algorithms operating on a processor that cause the processor to obtain information from inventory planning software applications and to translate the data to associated installation details, to obtain configuration data from a rack configuration framework or guidelines, and to perform other suitable functions associated with implementing a rack workflow. In one example embodiment, the rack workflow engine can provide step by step installation instructions in accordance with a predetermined rack configuration, such as to assist a user with configuring servers, routers, switches and edge servers as hardware devices, to configure servers associated with a switch or router in parallel and then to interconnect the switches that aggregate traffic from servers directly into a spine or network core, to implement a spine and leaf full-mesh topology, or in other suitable manners.

Rack validator 210 can be implemented as one or more algorithms operating on a processor that cause the processor to implement artificial intelligence or machine learning toolsets to verify and validate inputs to hardware components and network systems. In one example embodiment, rack validator 210 can use a site blueprint or templates and can verify that the functions associated with a rack are configured properly.

Figure 3:
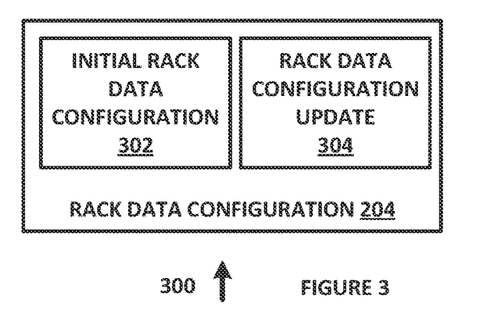
FIG. 3 is a diagram of a rack data configuration system, in accordance with an example embodiment of the present disclosure.

FIG. 3 is a diagram 300 of a rack data configuration system 204, in accordance with an example embodiment of the present disclosure. Rack data configuration system 204 includes initial rack data configuration system 302 and rack data configuration update system 304, each of which can be implemented in hardware or a suitable combination of hardware and software.

Initial rack data configuration system 302 can be implemented as one or more algorithms operating on a processor that cause the processor to generate an initial rack data configuration. In one example embodiment, the initial rack data configuration can include a naming convention for cabling or rack components or other suitable mechanisms for associating site data that is required to configure hardware with specific items of hardware, such as to allow the hardware to be re-configured in the event of the failure of one or more pieces of equipment or for other suitable purposes.

Rack data configuration update system 304 can be implemented as one or more algorithms operating on a processor that cause the processor to update a rack data configuration to include replacement equipment, new equipment, expanded functions or other suitable site updates. In one example embodiment, the updates can be implemented incrementally, as part of a template that includes multiple items of equipment or in other suitable manners.

Figure 4:
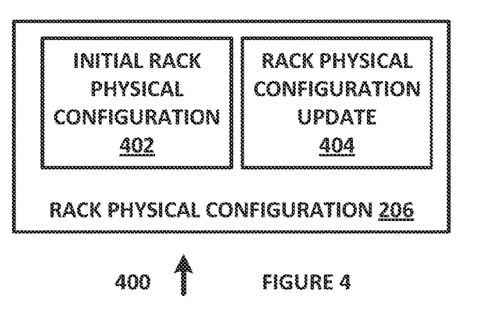
FIG. 4 is a diagram of a rack physical configuration system, in accordance with an example embodiment of the present disclosure.

FIG. 4 is a diagram 400 of a rack physical configuration system 206, in accordance with an example embodiment of the present disclosure. Rack physical configuration system 206 includes initial rack physical configuration system 402 and rack physical configuration update system 404, each of which can be implemented in hardware or a suitable combination of hardware and software.

Initial rack physical configuration system 402 can be implemented as one or more algorithms operating on a processor that cause the processor to generate an initial rack physical configuration. In one example embodiment, the initial rack physical configuration can include equipment identifiers, equipment physical locations or other suitable mechanisms for associating rack physical data that is required to identify hardware, such as to allow the hardware to be located in the event of the failure of one or more pieces of equipment or for other suitable purposes. For example, racks that serve similar purposes can have different physical configurations depending on their location, and initial rack physical configuration system 402 can be used to provide an image of an expected rack physical appearance in a specific location, such as adjacent to other equipment.

Rack physical configuration update system 404 can be implemented as one or more algorithms operating on a processor that cause the processor to update a rack physical configuration to include replacement equipment, new equipment, expanded functions or other suitable site updates. In one example embodiment, the updates can be implemented incrementally, as part of a template that includes multiple items of equipment or in other suitable manners.

Figure 5:
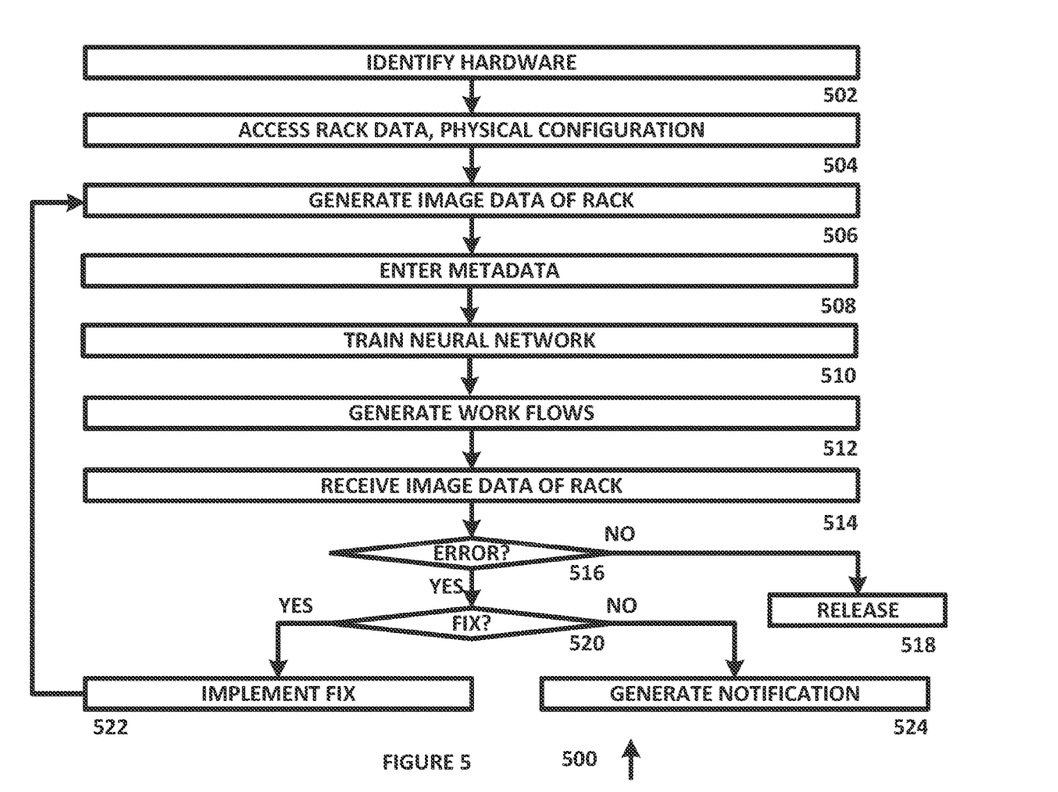
FIG. 5 is a diagram of an algorithm for providing an automated bot for error free racking-stacking, in accordance with an example embodiment of the present disclosure.

FIG. 5 is a diagram of an algorithm 500 for providing an automated bot for error free racking-stacking, in accordance with an example embodiment of the present disclosure. While algorithm 500 is described in regards to cloud computing, it can also or alternatively be used for enterprise networks, telecommunications data processing or other suitable applications. Algorithm 500 can be implemented on one or more processors.

Algorithm 500 begins at 502, where hardware that is to be installed is identified. In one example embodiment, an installer can use a computing device with a global positioning system or other suitable location systems, which can identify the location of the installer on a floor, in a room or in other suitable locations. The location data can be provided to a rack template system or other suitable systems, which can be used to identify templates for any racks in the same physical location. The algorithm then proceeds to 504.

At 504, rack data and physical configuration information is accessed. In one example embodiment, a rack data configuration system, a rack physical configuration system or other suitable systems can be used to obtain the rack data and physical configuration information for any racks that are in the vicinity of an installer. The algorithm then proceeds to 506.

At 506, image data for an installer is generated. In one example embodiment, the image data can include a series of images that the installer should see at each step of a work flow, images for improper installations and other suitable data. The algorithm then proceeds to 508.

At 508, metadata for the installer is generated. In one example embodiment, the metadata can be used to train a neural network, such as to identify specific items of equipment in a set of image data, specific types of cables or other suitable metadata. The algorithm then proceeds to 510.

At 510, a neural network is trained. In one example embodiment, the neural network can be a TensorFlow neural network, a Keras neural network, an Nvidia Metropolis neural network or other suitable neural networks that are able to identify specific features in a set of image data and to associate them with metadata, to allow equipment to be identified that matches a known correct or incorrect configuration. The algorithm then proceeds to 512.

At 512, work flows are generated. In one example embodiment, the work flows can include step by step instructions and images that use the same data that was used to train the neural network to provide instructions for an installer, with associated data that might be provided in addition to the neural network training data, such as instructions when to turn power on and off, when to test for an impedance or a data signal and so forth. The algorithm then proceeds to 514.

At 514, image data is received after an installation. In one example embodiment, the image data can be generated by a user at each step of an installation, in response to workflow instructions or images. In this example embodiment, steps 502 through 512 can be performed at a first location, and steps 514 through 524 can be performed at a second location, with additional steps 506 through 512 being performed after a fix has been attempted or implemented. Likewise, a remote operator can assist a local installer and algorithm 500 can be modified accordingly, or other suitable processes can also or alternatively be performed. The algorithm then proceeds to 516.

At 516, it is determined whether any errors have been detected from the image data that has been received after installation. If it is determined that no errors have been detected, the algorithm proceeds to 518. In an alternative embodiment, error detection can be performed after each step of a workflow, and a fix can be implemented as needed throughout the workflow, or other suitable processes can also or alternatively be performed. If the workflow has been completed and no errors are detected, the algorithm proceeds to 518 where the installation is released, such as by execution of a validation process or in other suitable manners. If it is determined that an error is present at 516, then the algorithm proceeds to 520.

At 520, it is determined whether an automated fix is available, if it is possible to configure the rack with the difference, or if other options are available. If it is determined that such options are available, the algorithm proceeds to 522, otherwise the algorithm proceeds to 524.

At 522, a fix is implemented. In one example embodiment, the fix can use artificial intelligence that is configured to present alternatives to an installer (such as how to configure non-conforming equipment), corrective actions to an installer (such as the identity of a cable that needs to be plugged into a different socket) or other suitable data. In another example embodiment, a remote operator can provide real-time assistance, modify work flows or provide other suitable data. The algorithm then returns to 506, 516 or other suitable steps. If an operation notification is generated at 524, a subsequent fix can be implemented at a later date, such as when proper equipment is available.

In operation, algorithm 500 provides for cloud computing site hardware and automated cloud software installation for an entire cloud computing system. Although algorithm 500 is shown as a flowchart, a person of skill in the art will recognize that it can also or alternatively be implemented using object-oriented programming, as a state diagram, as a ladder diagram, as a suitable combination of programming paradigms or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for hardware installation, comprising:
a rack template system operating on a first processor at a first location and configured to receive second location data and to provide a workflow of a series of rack image data sets as a function of the second location data;
an agent system operating on a second processor at the second location and configured to display each image of the series of rack image data sets and to prompt a user to enter user-generated image data sets using the second processor after the display of each image and performance of an installation process associated with the display of each image;
a rack workflow system operating on the first processor and configured to generate a series of installation instructions associated with the series of rack image data sets as a function of a template associated with the second location data; and
a rack validator operating on the first processor and configured to sequentially receive each image of the user-generated image data sets and to automatically determine whether each image of the user-generated image data sets matches a correct sequence of each image of the series of rack image data sets by comparing each image of the user-generated image data sets with a corresponding image of the series of rack image data sets using machine learning processing of the series of rack image data sets.

2. The system of claim 1 further comprising a rack data configuration system operating on the first processor and configured to generate rack hardware data for the workflow.

3. The system of claim 1 further comprising a rack physical configuration system operating on the first processor and configured to generate rack physical location data for the workflow.

4. The system of claim 1 further comprising a rack workflow system operating on the first processor and configured to generate a series of connection instructions associated with the series of rack image data sets.

5. The system of claim 1 wherein the agent system is configured to prompt a user to enter a single user-generated image data set after display of a rack image data set.

6. The system of claim 5 wherein the rack validator system generates a cable identifier when the series of user-entered image data sets do not match the series of rack image data sets.

7. The system of claim 2 further comprising a rack data configuration update system operating on the first processor and configured to receive a user control to update rack hardware data for the workflow.

8. The system of claim 3 further comprising a rack physical configuration update system operating on the first processor and configured to receive a user control to update rack physical location data for the workflow.

9. The system of claim 1 wherein the location data is location data of the second processor.

10. A method for hardware installation, comprising:
receiving first location data at a rack template system operating on a first processor at a second location;
generating a workflow of a series of rack image data sets as a function of the first location data;
displaying the series of rack image data sets at an agent system operating on a second processor at the first location;
prompting a user to enter user-generated image data sets using the second processor after the display of each image and performance of an installation process associated with the display of each image;
sequentially receiving each image of the user-generated image data sets at a rack validator operating on the first processor;
generating a series of cable connection instructions associated with the series of rack image data sets using a template associated with the first location data; and
automatically determining whether each image of the user-generated image data sets matches a corresponding image of the series of rack image data sets by comparing the user-generated image data sets with the series of rack image data sets using machine learning.

11. The method of claim 10 further comprising generating rack hardware data for the workflow using a rack data configuration system operating on the first processor.

12. The method of claim 10 further comprising generating rack physical location data for the workflow using a rack physical configuration system operating on the first processor.

13. The method of claim 10 further comprising generating a series of installation instructions associated with the series of rack image data sets using a rack workflow system operating on the first processor.

14. The method of claim 10 comprising prompting a user to enter a single user-generated image data set after display of a rack image data set with the agent system.

15. The method of claim 14 comprising generating a cable identifier using the rack validator system when the series of user-entered image data sets do not match the series of rack image data sets.

16. The method of claim 11 further comprising receiving a user control to update rack hardware data for the workflow.

17. The method of claim 12 further comprising receiving a user control to update rack physical location data for the workflow.

18. The method of claim 10 wherein the location data is location data of the second processor.

* * * * *